United States Patent [19]
Aono et al.
[11] Patent Number: 4,857,443
[45] Date of Patent: Aug. 15, 1989

[54] PHOTOGRAPHIC ELEMENT WITH BENZOGUANAMINE-FORMALDEHYDE POLYMER PARTICLES

[75] Inventors: Toshiaki Aono; Takeshi Shibata; Kazuma Takeno, all of Kanagawa, Japan

[73] Assignee: Fuji Photo Film Co., Ltd., Kanagawa, Japan

[21] Appl. No.: 190,855

[22] Filed: May 6, 1988

[30] Foreign Application Priority Data

May 6, 1987 [JP] Japan ................................ 62-110064
May 6, 1987 [JP] Japan ................................ 62-110065

[51] Int. Cl.[4] ............................ C03C 5/54; C03C 1/32
[52] U.S. Cl. .................................... 430/496; 430/207; 430/531; 430/630; 430/950; 430/961
[58] Field of Search ............... 430/207, 220, 531, 630, 430/950, 961, 496

[56] References Cited

U.S. PATENT DOCUMENTS 3,411,907 11/1968 Whitmore et al. .................. 430/950

*Primary Examiner*—Richard L. Schilling
*Attorney, Agent, or Firm*—Sughrue, Mion, Zinn, Macpeak, and Seas

[57] ABSTRACT

A photographic element comprising particulate benzoguanamine-formaldehyde condensation polymer is improved in writability and anti-adherence while maintaining photographic properties. A photographic element, particularly a dye-fixing element comprising a dye-fixing layer on one surface of a support and a hydrophilic colloid-containing back layer on the other surface of the support is improved in image density variation and anti-adherence when the back layer contains at least about 0.002 $cm^3/m^2$ of particles having a particle size of more than about 10 $\mu m$.

5 Claims, No Drawings

PHOTOGRAPHIC ELEMENT WITH BENZOGUANAMINE-FORMALDEHYDE POLYMER PARTICLES

BACKGROUND OF THE INVENTION

1. Field of the Invention

This invention relates to photographic elements, and more particularly, to photographic elements used in the field of photographic silver halide photosensitive material containing a high molecular weight matting agent.

2. Discussion of the Prior Art

Photographic elements generally have an outermost or surface layer which contains a hydrophilic organic colloid, typically gelatin as a binder. The surface of the photographic element becomes more adherent and tacky in a high temperature, high humidity atmosphere so that bonding or another failure would often occur when the element is contacted with another object. Such bonding will take place between photographic elements or between a photographic element and another object in contact therewith during preparation, shelf storage, picture taking, processing, and storage after processing, often resulting in serious troubles including blocking of stacked photographic elements, damage to a coating, transfer of a compound from a certain coating to another surface in contact therewith, and electric discharge failure.

Also, photographic elements are often required to have a surface, especially a back surface, which can be marked with a pencil or pen. Neither plastic film supports nor paper supports laminated with polyethylene or another plastic coating can be marked with a pencil or pen irrespective of whether or not they are coated with a binder such as gelatin.

One well-known solution to such problems is to incorporate finely divided material in the uppermost layer of a photographic element to increase the roughness of its surface. The surface is roughened, that is, matted to reduce adhesiveness and to impart writability. The finely divided material is generally known as a matting agent and includes inorganic materials such as silicon dioxide, magnesium oxide, titanium dioxide and calcium carbonate as well as organic materials such as starches, polymethyl methacrylate and cellulose acetate propionate.

These conventional matting agents have several drawbacks. For example, some matting agents adversely affect photographic properties. Some matting agents have a high specific gravity so that they settle in a coating solution, causing a trouble in a coating step during preparation of photographic elements. Some other matting agents are limited in size because of their preparation method and it is difficult to obtain a matting agent of a requisite size.

For the matting agents which are used to impart writability, it is generally known that harder ones are more effective. For the matting agents which are used for anti-adhesion, we have found that harder ones are more effective when anti-adhesion matting agents of the same size are compared. The matting agents which are known to be relatively hard are of inorganic material. Although the inorganic matting agents have a sufficiently high hardness to improve writability and anti-adhesion, they undesirably tend to settle in a dispersion or coating liquid during preparation of a photographic element because of their high specific gravity.

Color diffusion transfer image forming method uses a photographic element having at least one dye-fixing layer for receiving and fixing a mobile dye. Such a photographic element is referred to as a dye-fixing element. When the dye-fixing element is held horizontally in a low humidity atmosphere with its dye-fixing layer faced upward, the hydrophilic colloid in the dye-fixing layer contracts, causing the element to curl such that the opposite edges are bent above the original horizontal plane. When the dye-fixing element is held horizontally in a high humidity atmosphere with its dye-fixing layer faced downward, the hydrophilic colloid in the dye-fixing layer absorbs moisture and thus stretches, causing the element to curl such that the opposite edges are bent above the original horizontal plane. It is known in the art to prevent curling by applying a hydrophilic colloid layer or back layer of a suitable thickness to the surface of a support remote from the dye-fixing layer to thereby offset curling.

The dye-fixing layer often contains a salt such as a base or base precursor, a thermal solvent, or a low molecular weight compound such as a dye transfer aid for the purpose of promoting development of a photosensitive layer and promoting transfer of a dye from a photo-sensitive layer to the dye-fixing layer. Since the hydrophilic colloid (typically a binder such as gelatin) in the back layer is hygroscopic, the salt, thermal solvent or dye transfer aid migrates toward the hydrophilic colloid layer when such dye-fixing elements are stored in a stack. Then the concentration of the salt, thermal solvent or dye transfer aid in the dye-fixing layer lowers, causing a reduction of maximum density (Dmax) or a variation in image density. Adhesion failure occurs particularly when a protective layer generally used in the dye-fixing element is also a hydrophilic colloid layer or contains a similar salt.

Prior art methods for preventing adhesion of photographic elements are by loading a back layer with a matting agent having a particle size of about 1 to about 10 μm as disclosed in Japanese Patent Application Kokai No. 61-205935 or by providing a back layer with irregularities when it is positioned as the outermost layer. However, the former method of loading a matting agent having a particle size of about 1 to about 10 μm is not fully satisfactory, and the latter method of forming irregularities is cumbersome.

There is a need for developing a method capable of overcoming both density variation and adhesion failure.

SUMMARY OF THE INVENTION

A primary object of the present invention is to provide a photographic element which is improved in writability and adhesion failure while maintaining photographic properties.

Another object of the present invention is to provide a photographic element which is stable and easy to manufacture.

A further object of the present invention is to provide a photographic element which is free of density variation and adhesion failure.

A still further object of the present invention is to provide a dye-fixing element which is free of density variation and adhesion failure.

According to a first aspect of the present invention, there is provided a photographic element comprising particles of a benzoguanamine-formaldehyde condensation polymer.

According to a second aspect of the present invention, there is provided a photographic element comprising a support having a pair of opposed major surfaces, at least one dye-fixing layer on one surface of the support, and at least one hydrophilic colloid-containing back layer on the other surface of the support, the back layer containing at least about 0.002 $cm^3/m^2$ of particles having a particle size of more than about 10 μm.

In one preferred embodiment, the particles are formed of a benzoguanamine-formaldehyde condensation polymer. Preferably, the photographic element constitutes a dye-fixing element.

Differently stated, the use of particulate benzoguanamine-formaldehyde condensation polymer is generally effective for any photographic elements. Effectiveness of the particulate polymer does not depend on particle size.

A dye-fixing element is used to constitute a photographic element when an image forming method of heat development type is applied thereto. The dye-fixing element desirably contains a certain amount of particles having a size in excess of 10 μm in a back layer. The back layer should preferably contain at least 0.002 $cm^3/m^2$ of such large particles, which are most preferably formed of a benzoguanamine-formaldehyde condensation polymer.

DETAILED DESCRIPTION OF THE INVENTION

According to the first aspect of the present invention, the photographic element contains particles of a benzoguanamine-formaldehyde condensation polymer. The benzoguanamine-formaldehyde condensation polymer used herein has the following formula:

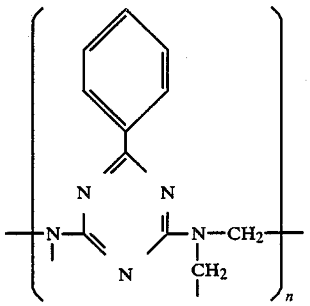

wherein n is a positive integer, preferably at least 10, more preferably at least 50. This polymer includes existing chemical substance 7-31 which is commercially available as Epostar (trademark, manufactured and sold by Nihon Catalyst Chemical K.K.), for example.

The particles of benzoguanamine-formaldehyde condensation polymer used herein (to be referred to as polymeric particles, hereinafter) are usually white spherical fine particles. The particle size defined as average particle diameter generally ranges from about 0.1 to about 70 μm. Polymeric particles of a suitable size may be used depending on the intended application. Because of white color, the polymeric particles do not adversely affect the photographic properties of the associated element.

The polymeric particles used herein are hard as demonstrated by a hardness of at least 40 in durometer D scale as measured by JIS K 7215. Because of hardness, the polymeric particles are quite effective in improving anti-adhesion and writability. The polymeric particles invite no problem during the preparation of a photographic element because they have a relatively low specific gravity so that they may settle in a dispersion or coating liquid quite slowly.

The polymeric particles may be contained in any layer of photosensitive material and image-receiving or dye-fixing material constituting the photographic element of the present invention. Better results are obtained particularly when the polymeric particles are contained as a matting agent in a protective layer of a photosensitive material or in a protective layer or a back layer of a dye-fixing material. The polymeric particles preferably have a size of about 0.1 to about 10 μm, more preferably from about 0.5 to about μm, most preferably from about 1 to about 6 μm when they are used as a matting agent.

When the polymeric particles are used as a matting agent, a conventional well-known matting agent may be used in combination therewith. The matting agent is well known in the photographic art and defined as discrete solid particles of inorganic or organic material dispersible in a hydrophilic organic colloid binder. Examples of the inorganic matting agent include oxides such as silicon dioxide, titanium oxide, magnesium oxide, and aluminum oxide; alkaline earth metal salts, for example, sulfates and carbonates such as barium sulfate, calcium carbonate and magnesium sulfate; silver halide particles which do not form an image, for example, silver chloride and silver bromide both having a minor content of iodine as an optional halogen content; and glass.

Examples of the organic matting agent include starch, cellulose esters such as cellulose acetate propionate, cellulose ethers such as ethyl cellulose, and synthetic resins. The synthetic resins are generally available as dispersions of water-insoluble or substantially water-insoluble synthetic polymers which are prepared from such monomers as alkyl acrylates and methacrylates, alkoxyalkyl acrylates and methacrylates, glycidyl acrylates and methacrylates, acrylamides and methacrylamides, vinyl esters (such as vinyl acetate), acrylonitrile, olefins, and styrene alone or in admixture of two or more monomers or in combination with another monomers such as acrylic acid, methacrylic acid, α,β-unsaturated dicarboxylic acids, hydroxyalkyl acrylates and methacrylates, sulfoalkyl acrylates and methacrylates, and styrene sulfonate.

The protective layer or back layer which contains the matting agent preferably has a thickness of about 1/10 to about ⅓ of the average particle size (diameter) of the matting agent because anti-adhesion, anti-blocking, writability and releasability are further improved.

The protective layer or back layer each may consist of a plurality of layers provided that the matting agent is contained in the outermost layer. When the protective or back layer consists of two layers, for example, at least one layer may preferably have oil droplets dispersed therein. The oil droplets preferably have a size of from about 0.01 to about 10 μm, more preferably from about 0.05 to about 5 μm. The oil droplets are preferably formed of a high-boiling organic compound which is usually used for dispersion of a photographic coupler. Preferred high-boiling organic compounds have a boiling point of at least 180° C. under atmospheric pressure, for example, those compounds described in U.S. Patent No. 2,322,027. Specific examples of the high-boiling organic compound will be listed later.

The polymeric particles according to the present invention may be used in a variety of conventional photographic silver halide photosensitive materials.

The polymeric particles according to the present invention may be applied to color photographic materials using couplers, for example. The color photoraphic materials include picture-taking color negative films (including consumer, professional and motion picture films), color reversal films, color photographic papers, color reversal photographic papers, and cinema positive films.

The polymeric particles according to the present invention may also be applied to a silver dye bleaching process as described in Chapter 12, Principles and Chemistry of Color Photography IV, Silver Dye Bleach Process of T. H. James Ed., "The Theory of the Photographic Process," 4th ed., Macmillan, New York (1977), pages 363–366.

The polymeric particles according to the present invention may also be applied to black-and-white photosensitive materials which include medical X-ray films, ordinary picture-taking black-and-white films, lithographic films, and scanner films.

The polymeric particles according to the present invention may be contained in an emulsion layer, an intermediate layer, a surface protective layer and a back layer of the foregoing color and black-and-white photosensitive materials, and particularly in an outermost layer thereof.

Since it is difficult to coat all layers at the same time, a photographic element of multi-layered structure is usually prepared by separately coating layers several times. A web of support is first coated and wound up on a roll before a subsequent coating is applied thereto. There is the likelihood that the fresh coating bonds to the back surface of the web when the web is kept in roll form. When the polymeric particles according to the present invention are contained in either of the coatings, preferably an outermost layer to be applied during the first coating, the adhesion between adjoining turns of a roll is drastically minimized.

The silver halide used herein may be selected from silver chloride, silver bromide, silver iodide, silver chlorobromide, silver chloroiodide, silver iodobromide, and silver chloroiodobromide, but is not limited thereto. Silver halide grains may have a uniform halogen composition or a multiple structure in which the surface and internal portions have different compositions as disclosed in Japanese Patent Application Kokai Nos. 57-154232, 58-108533, 59-48755 and 59-52237, U.S. Patent No. 4,433,048 and European Patent No. 100,984. Also employable herein are plate grains having a thickness of up to 0.5 μm, a diameter of at least 0.6 μm, and an average aspect ratio of at least 5 as disclosed in U.S. Pat. No. 4,414,310 and 4,435,499 and West German Patent Application OLS No. 3,241,646A1 and monodispersed emulsions having an approximately uniform grain size distribution as disclosed in Japanese Patent Application Kokai Nos. 57-178235, 58-14829, and 58-100846, PCT International Publication 83/02338A1-,European Patent Nos. 64,412A3 and 83,377A1. Also useful is a mixture of two or more species of silver halide having different crystal habit, halogen composition, grain size and grain size distribution. Two or more monodispersed emulsions having different grain sizes may be admixed to control gradation.

It is desired that the grain size of silver halide range from 0.001 to 10 μm, especially from 0.001 to 5 μm in average grain diameter. These silver halide emulsions may be prepared by any desired methods including acidic, neutral and ammonia methods. The mode of reaction of a soluble silver salt with a soluble halide salt may be single jet mixing, double jet mixing, and a combination thereof. Also employable is a method of forming silver halide grains in the presence of excess silver ions, which is known as a reverse mixing method. One special type of simultaneous mixing method is by maintaining constant the pAg of a liquid phase in which a silver halide is formed, which is known as a controlled double jet method. The concentration and amount of silver and halide salts added as well as their addition rate may be increased to accelerate grain growth as disclosed in Japanese Patent Application Kokai Nos. 55-142329 and 55-158124 and U.S. Pat. No. 3,650,757.

Epitaxial junction type silver halide grains are also useful as disclosed in Japanese Patent Application Kokai No. 56-16124 and U.S. Pat. No. 4,094,684.

When silver halide is used alone in a heat development system without an organic silver salt oxidizing agent, those species of silver chloroiodide, silver iodobromide and silver chloroiodobromide are preferred in which an X-ray pattern characteristic of silver iodide crystals is observable. For example, silver iodobromide having such characteristics may be obtained by adding a silver nitrate solution to a potassium bromide solution to form silver bromide grains and adding potassium iodide thereto.

At the stage when silver halide grains used herein are formed, various silver halide solvents may be used, for example, ammonia, organic thioether derivatives as disclosed in Japanese Patent Publication No. 47-11386 and sulfur-containing compounds as disclosed in Japanese Patent Application Kokai No. 53-144319.

In the step of forming or physically ripening silver halide grains, there may coexist a cadmium salt, zinc salt, lead salt, or thallium salt.

For the purpose of improving high and low intensity reciprocity law failures, water-soluble irridium salts such as irridium (III, IV) chloride and ammonium hexachloroirridate and water-soluble rhodium salts such as rhodium chloride may be used.

The silver halide emulsion is generally removed of soluble salts after precipitation or physical ripening. Soluble salt removal means may be a traditional noodle rinsing method or a flocculation method.

The silver halide emulsion may be used without post-ripening, but usually chemically sensitized. For chemical sensitization purpose, there may be employed sulfur sensitization, reducing sensitization, noble metal sensitization, and combinations thereof which are well known with conventional photosensitive material-forming emulsions. Chemical sensitization may be carried out in the presence of a nitrogeneous heterocyclic compound as disclosed in Japanese Patent Application Kokai Nos. 58-126526 and 58-215644.

The silver halide emulsion used herein may be either of a surface latent image type wherein a latent image is formed on the grain surface or of an internal latent image type wherein a latent image is formed in the grain interior. A direct reversal emulsion comprising an internal latent image type emulsion combined with a nucleating agent may also be used. The internal latent image type emulsions suitable for this purpose are described in U.S. Patent No. 2,592,250 and 3,761,276, Japanese Patent Publication No. 58-3534 and Japanese Patent Application Kokai No. 57-136641. Preferred examples of the nucleating agent to be combined therewith are described in U.S. Pat. Nos. 3,227,552, 4,245,037, 4,255,511, 4,266,031 and 4,276,364 and West German Patent Application OLS No. 2,635,316.

The silver halides used in the practice of the present invention may be spectrally sensitized with methine dyes and other dyes. The dyes useful for spectral sensitization include cyanine dyes, merocyanine dyes, complex cyanine dyes, complex merocyanine dyes, holopolar cyanine dyes, hemicyanine dyes, styryl dyes, and hemioxonol dyes. Particularly useful dyes among them are cyanine, merocyanine, and complex merocyanine dyes.

For these dyes, any nuclei generally utilized for cyanine dyes can be applied as basic heterocyclic ring nuclei. For example, applicable are pyrroline nuclei, oxazoline nuclei, thiazoline nuclei, pyrrole nuclei, oxazole nuclei, thiazole nuclei, selenazole nuclei, imidazole nuclei, tetrazole nuclei, pyridine nuclei, etc.; and nuclei of the foregoing nuclei having cycloaliphatic hydrocarbon rings fused thereto and nuclei of the foregoing nuclei having aromatic hydrocarbon rings fused thereto, such as indolenine nuclei, benzindolenine nuclei, indole nuclei, benzoxazole nuclei, naphthoxazole nuclei, benzothiazole nuclei, naphthothiazole nuclei, benzoselenazole nuclei, benzimidazole nuclei, quinoline nuclei, etc. These nuclei may be substituted on carbon atoms.

For the merocyanine and complex merocyanine dyes, 5- or 6-membered heterocyclic nuclei are applicable as a nucleus having a ketomethylene structure, for example, a pyrazolin-5-one nucleus, thiohydantoin nucleus, 2-thiooxazolidine-2,4-dione nucleus, thiazolidine-2,4-dione nucleus, rhodanine nucleus, and thiobarbituric acid nucleus.

The sensitizing dyes may be used alone or in combination. Combinations of sensitizing dyes are often used particularly for the purpose of supersensitization.

Along with the sensitizing dyes, the emulsions may contain dyes which themselves have no spectral sensitization effect or substances which do not substantially absorb visible light, but have the nature of supersensitization. Useful are aminostyryl compounds having a nitrogenous heterocyclic substituent as described in U.S. Pat. Nos. 2,933,390 and 3,635,721, aromatic organic acid-formaldehyde condensates as described in U.S. Pat. No. 3,743,510, cadmium salts and azaindenes. Particularly useful combinations are described in U.S. Pat. Nos. 3,615,613, 3,615,641, 3,617,295 and 3,635,721.

A binder or protective colloid is used in an emulsion or intermediate layer of the photosensitive material according to the present invention. The preferred binder is gelatin although another hydrophilic colloid may be used alone or along with gelatin.

The gelatin used herein may be either a lime-treated gelatin or an acid-treated gelatin. The preparation of gelatin is described in Arthur Vice, "The Macromolecular Chemistry of Gelatin," Academic Press (1964).

Surface-active agents may be added alone or in admixture to the photographic emulsion used herein. They are generally used as coating aids, but sometimes applied for the purpose of improving emulsification and photographic properties, especially for sensitization as well as antistatic and anti-adhesion purposes. The surface-active agents are classified into natural surfactants such as saponins; nonionic surfactants such as alkylene oxide, glycerin, and glycidol derivatives; cationic surfactants such as higher alkyl amines, quaternary ammonium salts, heterocyclics like pyridine, phosphoniums and sulfoniums; anionic surfactants having an acidic group such as a carboxylic, sulfonic, phosphoric, sulfate ester, and phosphate ester group; and amphoteric surfactants such as amino acids, amino sulfonic acids, sulfate and phosphate esters of amino alcohols.

The photographic emulsion used herein may contain various compounds for the purpose of preventing fogging during preparation, shelf storage, or photographic processing of photosensitive material, or stabilizing photographic properties. Typical are compounds known as antifoggants or stabilizers, for example, azoles such as benzothiazolium salts, nitroimidazoles, nitrobenzimidazole, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles (inter alia, 1-phenyl-5-mercaptotetrazole), etc.; mercaptopyrimidines; mercaptotriazines; thioketo compounds such as oxazolinethione; azaindenes such as triazaindenes, tetraazaindenes (inter alia, 4-hydroxy substituted-1,3,3*a*,7tetraazaindenes), and pentaazaindenes; benzenethiosulfonic acid, benzenesulfinic acid, benzenesulfonic acid amide, etc.

For the purpose of increasing sensitivity, enhancing contrast, or promoting development, the photographic photosensitive material used herein may contain thioethers, thiomorphorines, quaternary ammonium salts, urethane derivatives, urea derivatives, imidazole derivatives and 3-pyrazolidones in its photographic emulsion layer.

For the purpose of improving dimensional stability, the photographic photosensitive material used herein may contain dispersions of water-insoluble or substantially water-insoluble synthetic polymers in its photographic emulsion layer or another hydrophilic colloid layer. The polymers used herein may be prepared from such a monomer as an alkyl acrylate or methacrylate, alkoxyalkyl acrylate or methacrylate, glycidyl acrylate or methacrylate, acrylamide or methacrylamide, vinyl ester (such as vinyl acetate), acrylonitrile, olefin, and styrene alone or a mixture thereof or a combination thereof with acrylic acid, methacrylic acid, $\alpha,\beta$-unsaturated dicarboxylic acid, hydroxyalkyl methacrylate, sulfoalkyl acrylate or methacrylate, or styrene sulfonic acid.

When the present invention is applied to a color photographic photosensitive material of coupler type, any conventional well-known couplers may be used. Examples of the coupler include magenta couplers such as 5-pyrazolone couplers, pyrazolobenzimidazole couplers, pyrazoloimidazole couplers, pyraolopyrazole couplers, pyrazolotriazole couplers, pyrazolotetrazole couplers, cyanoacetylcumaron couplers, and closed ring acylacetonitrile couplers; yellow couplers such as acylacetoamide couplers (for example, benzoylacetanilides and pyvaloylacetanilides); and cyan couplers such as naphthol couplers and phenol couplers. Anti-diffusible couplers having a hydrophobic group called ballast group in the molecule thereof and polymerized couplers are desirable among these couplers. The couplers may be of either four or two equivalent with respect to silver ion. Also useful are colored couplers having a color compensation effect and couplers capable of releasing a development inhibitor upon development which are known as DIR couplers.

Also contemplated other than the DIR couplers are colorless DIR coupling compounds which undergo coupling reaction to produce a colorless product and release a development inhibitor. Instead of the DIR coupler, the photosensitive material may contain a compound capable of releasing a development inhibitor upon development.

The couplers and similar agents may be used alone or in admixture. To meet the properties desired for photosensitive material, a mixture of two or more couplers may be contained in a single layer or a single compound may be added to more than one layer.

The foregoing dye-providing substances and couplers may be introduced into a layer of photosensitive material by any well-known methods, for example, the method described in U.S. Pat. No. 2,322,027.

To this end, an organic solvent having a high boiling point or an organic solvent having a low boiling point may be used. Examples of the high-boiling organic solvent include phthalic acid alkyl esters (such as dibutyl phthalate, dioctyl phthalate, etc.), phosphoric acid esters (such as diphenyl phosphate, triphenyl phosphate, tricresyl phosphate, dioctylbutyl phosphate, etc.), citric acid esters (such as tributyl acetylcitrate, etc.), benzoic acid esters (such as octyl benzoate, etc.), alkylamides (such as diethyl laurylamide, etc.), fatty acid esters (such as dibutoxyethyl succinate, diethyl azelate, etc.), and trimesic acid esters (such as tributyl trimesate, etc.). Examples of the organic solvent having a low boiling point of about 30° C. to 150° C. include lower alkyl acetates (such as ethyl acetate, butyl acetate, etc.), ethyl propionate, sec-butyl alcohol, methyl isobutyl ketone, beta-ethoxyethyl acetate, methyl cellosolve acetate, etc. Mixtures of the above-described high boiling organic solvents and low boiling organic solvents may also be used. For example, the dye-providing substance or coupler is first dissolved in a high or low-boiling organic solvent and then dispersed in a hydrophilic colloid.

Further, it is possible to use a method for dispersion in polymers as described in Japanese Patent Publication No. 51-39853 and Japanese Patent Application Kokai No. 51-59943.

When couplers have an acid group such as a carboxylic or sulfonic group, an alkaline aqueous solution thereof may be introduced into a hydrophilic colloid.

The photographic photosensitive material used herein may contain an inorganic or organic hardener in a photographic emulsion layer or another hydrophilic colloid layer thereof. Examples of the hardeners include chromium salts (e.g., chromium alum and chromium acetate), aldehydes (e.g., formaldehyde, glyoxal and glutaric aldehyde), N-methylols (e.g., dimethylol urea and methylol dimethylhydantoin), dioxanes (e.g., 2,3-dihydroxydioxane), active vinyl compounds (e.g., 1,3,5-triacryloyl-hexahydro-s-triazine and 1,3-vinylsulfonyl-2-propanol), active halides (e.g., 2,4-dichloro-6-hydroxy-s-triazine), and mucohalogenic acids (e.g., mucochloric acid and mucophenoxychloric acid) alone or in admixture.

When such agents as dyes and ultraviolet absorbers are contained in a hydrophilic colloid layer in a photosensitive material constituting a photographic element according to the present invention, they may be mordanted with cationic polymers.

The photosensitive material constituting a photographic element according to the present invention may contain as a color fog preventing agent in the form of a hydroquinone derivative, aminophenol derivative, gallic acid derivative, and ascorbic acid derivative.

The photosensitive material constituting a photographic element according to the present invention may contain a ultraviolet (UV) radiation absorber in a hydrophilic colloid layer thereof. Useful for this purpose are benzotriazoles having an aryl substituent as disclosed in U.S. Pat. No. 3,533,794, 4-thiazolidones as disclosed in U.S. Pat. Nos. 3,214,794 and 3,352,681, benzophenones as disclosed in Japanese Patent Application Kokai No. 46-2784, cinnamic esters as disclosed in U.S. Pat. Nos. 3,705,805 and 3,707,375, butadienes as disclosed in U.S. Pat. No. 4,045,229, benzoxydoles as disclosed in U.S. Pat. No. 3,700,455, and other UV-absorbing polymers. UV absorbing couplers such as α-naphtholic cyan dye-forming couplers and UV absorbing polymers may also be used. These UV absorbers may be mordanted in a particular layer.

The photosensitive material used herein may contain a water-soluble dye as a filter dye or for the purpose of preventing irradiation or any other purposes. Examples of the dye include oxonol dyes, hemioxonol dyes, styryl dyes, merocyanine dyes, cyanine dyes, and azo dyes. Oxonol, hemioxonol and merocyanine dyes are particularly useful.

The photosensitive material used herein may contain a well-known anti-fading agent. Such color image stabilizers may be used alone or in admixture of two or more. Examples of the anti-fading agent include hydroquinone derivatives, gallic acid derivatives, p-alkoxyphenols, p-oxyphenol derivatives, and bisphenols.

When the photographic element of the present invention comprises a conventional photographic silver halide photosensitive material, it may be developed by any desired method. Any desired combination of well-known methods and processing liquids as described in Research Disclosure, Vol. 176, pages 28–30 may be used. The photographic processing may be either silver image-forming photographic processing, that is, black-and-white photographic processing or dye image-forming photographic processing, that is, color photographic processing. The processing temperature is generally selected in the range of from 18° C. to 50° C. although temperatures lower than 18° C. or higher than 50° C. are also acceptable.

The polymeric particles used in the present invention may be added to a photosensitive element and/or a dye-fixing element which is a photographic element used in a process for forming a color image by forming or releasing a diffusible dye imagewise and then fixing the dye.

The color image-forming process used in the practice of the present invention includes a color diffusion transfer system wherein development is carried out with a developer as described in Belgium Pat. No. 757,959, and a heat development system wherein heat development is carried out to produce a diffusible hydrophilic dye image as described in European Pat. No. 76492A, Japanese Patent Application Kokai Nos. 58-79247 and 58-58543, U.S. Pat. Nos. 4,463,079, 4,474,867, 4,478,927, 4,483,914, 4,500,626, 4,507,380, and 4,704,345, EP 220,746A2 and 210,660A2. The present invention is applicable to either of these systems.

The polymeric particles according to the present invention may be added not only to a protective layer or a back layer of a photographic photosensitive material as described above, but also to any of various other layers such as a photosensitive layer, intermediate layer, dye-providing substance-containing layer, image-receiving layer, white reflection layer, neutralizing layer, and neutralization timing layer.

In one preferred embodiment of the second aspect of the present invention, there is provided a dye-fixing element which has at least one dye-fixing layer containing a mordant on one surface of a support and at least one back layer containing hydrophilic colloid on the other surface of the support. The back layer contains at least about 0.002 $cm^3$,preferably from about 0.05 to about 0.5 $cm^3$,most preferably from about 0.01 to about 0.3 $cm^3$ per square meter of the support of matte agent particles having a particle size of more than about 10 μm, preferably from about 12 to about 50 μm, most preferably from about 12 to about 30 μm. Then image density variation and bonding trouble are minimized.

Matte agent particles having such a large particle size are used in an amount of at least 0.002 $/m^2$, because otherwise dye-fixing elements would bond with each other during storage in stack form or a dye image variation would still occur when dye-fixing elements are used after storage in stack form. If the matte agent particles are used in an excess amount, there occur several problems due to a too rough back surface including an unpleasant touch to hands, an increased haze, and difficulty of automatic supply in an automatic processing machine. It is thus usually desired to use the matte agent particles in an amount of up to 0.5 $cm^3/m^2$.

According to the present invention, the matte agent particles present in the above-specified amount have a particle size of more than 10 μm, preferably at least twice, more preferably at least three times the coating thickness of the back layer.

When more than one back layer is formed, the matte agent is preferably added to a back layer more adjacent to the support rather than the outermost back layer. Possible exfoliation of the matte agent from the back layer is then prevented.

The matting agent is well known in the photographic art and defined as discrete solid particles of inorganic or organic material dispersible in a hydrophilic organic colloid binder. Examples of the inorganic matting agent include oxides such as silicon dioxide, titanim oxide, magnesium oxide, and aluminum oxide; alkaline earth metal salts, for example, sulfates and carbonates such as barium sulfate, calcium carbonate and magnesium sulfate; silver halide particles which do not form an image, for example, silver chloride and silver bromide both having a minor content of iodine as an optional halogen content; and glass.

Examples of the organic matting agent include starches such as corn starch and rice starch, cellulose esters such as cellulose acetate propionate, cellulose ethers such as ethyl cellulose, and synthetic resins. The synthetic resins are generally available as dispersions of water-insoluble or substantially water-insoluble synthetic polymers which are prepared from such monomers as alkyl acrylates and methacrylates, alkoxyalkyl acrylates and methacrylates, glycidyl acrylates and methacrylates, acrylamides and methacrylamides, vinyl esters (such as vinyl acetate), acrylonitrile, olefins (such as ethylene), styrene, and benzoguanamine-formaldehyde condensates alone or in admixture of two or more monomers or in combination with another monomer such as acrylic acid, methacrylic acid, α,β-unsaturated dicarboxylic acids, hydroxyalkyl acrylates and methacrylates, sulfoalkyl acrylates and methacrylates, and styrene sulfonate. In addition, epoxy resins, nylon, polycarbonate, phenol resins, polyvinyl carbazole and polyvinylidene chloride may also be used.

Preferred among others are benzoguanamineformaldehyde condensation polymers as previously defined, polyolefin (for example, Flow Bead LE-1080, CL-2080 and HE-5023 manufactured by Seitetsu Chemicals K.K. and Chemi-Pearl V-100 manufactured by Mitsui Petro-Chemical K.K.), as well as polystyrene beads, nylon beads, AS resin beads, epoxy resin beads, and polycarbonate resin beads, all commercially available from Mortex Company. The best matte agent is of benzoguanamine-formaldehyde condensation polymer. Different types of matte agent may be used in admixture.

Better results are obtained when the matte agent used herein is harder. More particularly, the matte agent preferably has a hardness of at least 40, more preferably at least 60 in durometer D scale as measured according to JIS K 7215.

The geometrical shape of the matte agent used herein is not particularly limited and may include irregular and rounded shapes. Rounded shapes are preferred to angled shapes, and spherical shapes are most preferred.

The matte agent may preferably be transparent or white in color, more preferably transparent.

The back layer may contain colloidal silica. The colloidal silica used herein has an average particle size of 7 mμ to 120 mμ and consists predominantly of silicon dioxide and may contain a minor proportion of alumina or sodium aluminate. The colloidal silica may further contain a stabilizer, for example, inorganic bases such as sodium hydroxide, potassium hydroxide, lithium hydroxide, and ammonium hydroxide and organic salts such as tetramethyl ammonium ion. Particularly preferred stabilizers for colloidal silica are potassium hydroxide or ammonium hydroxide.

With respect to colloidal silica, reference is made to, for example, Egon Matijevic Ed., "Surface and Colloid Science," Vol. 6, pages 3–100 (1973), John Willey & Sons.

Examples of the colloidal silica are commercially available products such as Ludox AM, Ludox AS, Ludox LS, Ludox TM, and Ludox HS available from E. I. duPont de Nemours & Co. (U.S.A.), Snowtex 20, Snowtex C, Snowtex N, and Snowtex O available from Nissan Chemical K.K. (Japan), Syton C-30 and Sycon 200 available from Monsanto Co. (U.S.A.), and Nalcoag 1030, Nalcoag 1060 and Nalcoag ID-21-64 available from Nalco Chem. Co. (U.S.A.).

The amount of colloidal silica used in the back layer preferably ranges from 5/100 to 1/10, more preferably from 2/10 to 7/10 as expressed in dry weight ratio of colloidal silica to the gelatin used as the binder of the back layer.

The back layer is formed by applying a hydrophilic colloid layer to the surface of a support remote from the dye-fixing layer previously formed thereon. The hydrophilic colloid material used herein is preferably a hydrophilic organic high molecular weight compound, usually hydrophilic natural or synthetic high molecular weight compounds. Preferred examples include natural substances, for example, proteins such as gelatin and gelatin derivatives and polysaccharides such as cellulose derivatives, starch and gum arabic as well as water-soluble polyvinyl compounds such as polyvinyl alcohol, polyvinyl pyrolidone and acrylamide polymers. Gelatin and gelatin derivatives are preferred. The gelatin used herein include lime-treated gelatin, acid-treated gelatin and enzyme-treated gelatin as described in Bull. Soc. Phot. Japan, No. 16 (1966), page 30, as well as hydrolyzates and proteolyzates of gelatin. The gelatin derivatives used herein may be obtained, for example, by reacting gelatin with a variety of compounds such as acid halides, acid anhydrides, isocyanates, bromoacetic acid, alkane sultones, vinylsulfonamides, maleimides, polyalkylene oxides, and epoxy compounds, or by graft polymerizing homopolymers or copolymers of acrylic acid, methacrylic acid, ester and amide derivatives thereof, and vinyl monomers such as acrylonitrile and styrene to gelatin.

The back layer may be a single layer or two or more layers. The thickness of the back layer is not particularly limited although it preferably ranges from about 0.5 to about 15 μm, more preferably from about 1 to 10 μm.

The amount of binder in the back layer is not particularly limited although it preferably ranges from about 0.5 to about 15 g/m$^2$.

The back layer used herein may contain another well-known additive as will be described later.

The dye-fixing layer used herein is a layer capable of fixing a mobile dye which is released upon development. For the purpose of fixing a dye, a polymeric mordant or a dye-acceptable polymer as disclosed in Japanese Patent Application Kokai No. 57-198458 may be used.

The dye-acceptable polymer which can be used in the dye-fixing layer is an organic high molecular weight substance having a glass transition temperature of from about 40° C. to about 250° C. The mechanism through which a dye released from a dye-providing substance enters a polymer has not been fully understood. In general, it is believed that the thermal motion of a polymer chain is enhanced at a processing temperature of above the glass transition temperature, to create interstices between chain molecules so that the dye can enter the interstices. For this reason, if a layer containing an organic high molecular weight substance having a glass transition temperature of from about 40° C. to about 250° C. is used as the dye-fixing layer, then there is obtained a clear image in which only the dye has entered the dye-fixing layer because the dye-fixing layer discriminates the dye from the dye-providing substance.

Examples of the organic high molecular weight substance used herein include polystyrenes having a molecular weight of from about 2,000 to about 85,000, polystyrene derivatives with a substituent having up to 4 carbon atoms, polyvinylcyclohexane, polydivinylbenzene, polyvinyl pyrrolidone, polyvinylcarbazole, polyallylbenzene, polyvinyl alcohol, polyacetals such as polyvinyl formal and polyvinyl butyral, polyvinyl chloride, chlorinated polyethylene, polyethylene trichlorofluoride, polyacrylonitrile, poly-N,N-dimethylacrylamide, polyacrylates having a p-cyanophenyl, pentachlorophenyl or 2,4-dichlorophenol group, polyesters such as poly(acryl chloroacrylate), poly(methyl methacrylate), poly(ethyl methacrylate), poly(propyl methacrylate), poly(isopropyl methacrylate), poly(isobutyl methacrylate), poly(tert.-butyl methacrylate), poly(cyclohexyl methacrylate), polyethylene glycol dimethacrylate, poly-2-cyanoethyl methacrylate, and polyethylene terephthalate, polysulfone, polycarbonates such as bisphenol-A polycarbonate, polyanhydrides, polyamides, and cellulose acetates. Also useful are those synthetic polymers having a glass transition temperature between 40° C. and 250° C. described in J. Brandrup & E. H. Immergut Ed., "Polymer Handbook," 2nd Edition, John Wiley & Sons. These high molecular weight substances may be used alone or in admixture or two or more of them may be combined to form a copolymer. These polymers may serve as a support applied to a photographic element as will be described later or form a layer independent from a support.

In the practice of the present invention, the dye-fixing element preferably has a dye-fixing layer containing a mordant. The mordant used herein may be chosen from commonly used ones. Polymeric mordants are preferred among others. The polymeric mordants include polymers containing a tertiary amino group, polymers having a nitrogeneous heterocyclic moiety, and polymers having a quaternary cation group of such type.

Examples of homopolymers and copolymers containing a vinyl monomer unit having a tertiary amino group are given below. The figure attached to a monomer unit represents mol % hereinafter.

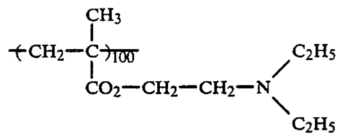

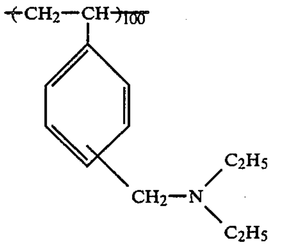

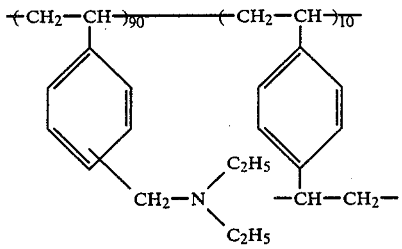

Examples of homopolymers and copolymers containing a vinyl monomer unit having a tertiary imidazole group include the mordants described in U.S. Pat. Nos. 3,148,061, 4,115,124, and 4,282,305 and Japanese Patent Application Kokai Nos. 60-118834 and 60-122941. Several examples thereof are given below.

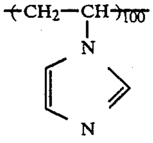

-continued

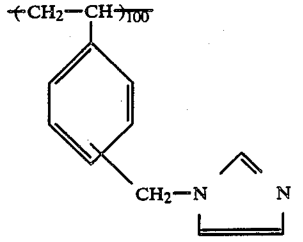

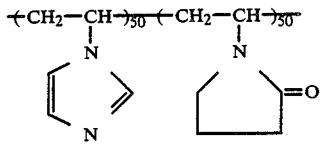

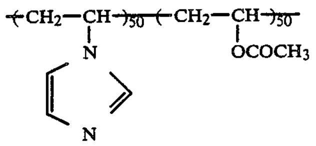

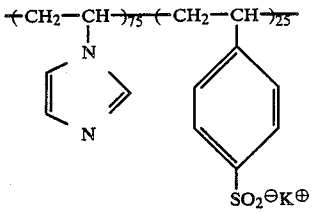

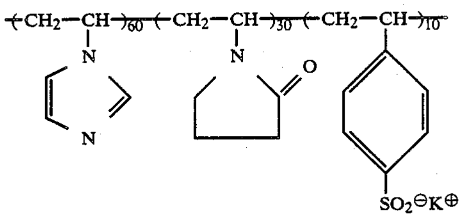

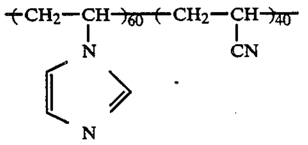

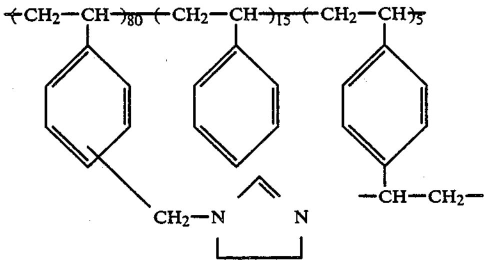

Examples of homopolymers and copolymers containing a vinyl monomer unit having a quaternary imidazolium salt include the mordants described in British Pat. Nos. 1,594,961, 2,056,101, and 2,093,041, U.S. Pat. Nos. 4,115, 124, 4,124, 4,124,386, 4,273,853, and 4,450,224 and Japanese Patent Application Kokai No. 48-28325. Several examples thereof are given below.

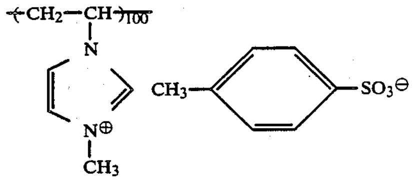

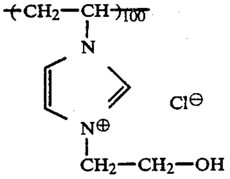

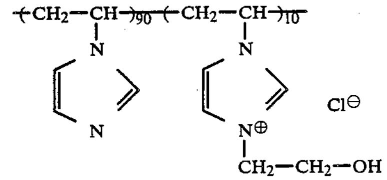

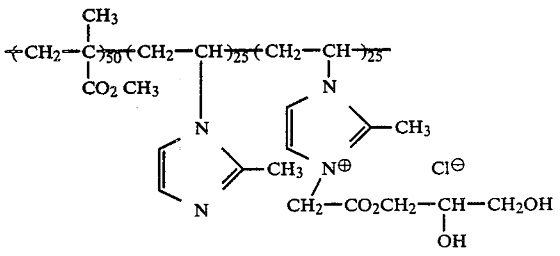

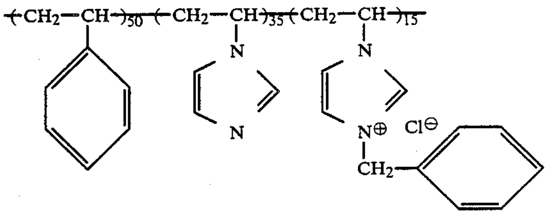

Examples of homoplymers and copolymers containing a vinyl monomer unit having a quaternary ammonium salt include the mordants described in U.S. Pat. Nos. 3,709,690, 3,898,088, and 3,958,995 and Japanese Patent Application Kokai Nos. 60-57836, 60-122940, 60-122942 and 60-235134. Several examples thereof are given below.

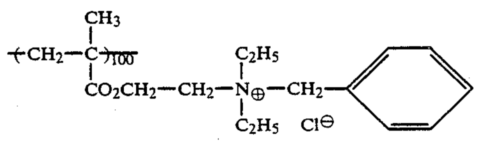

-continued

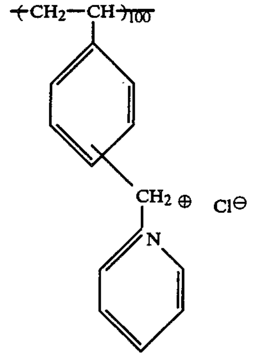

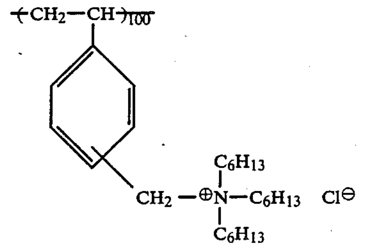

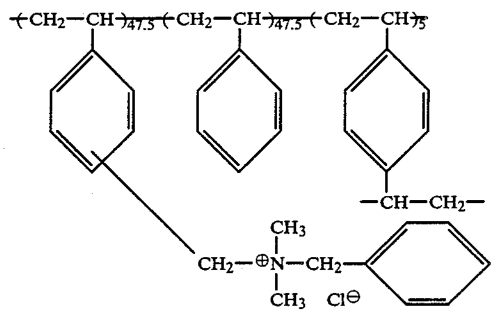

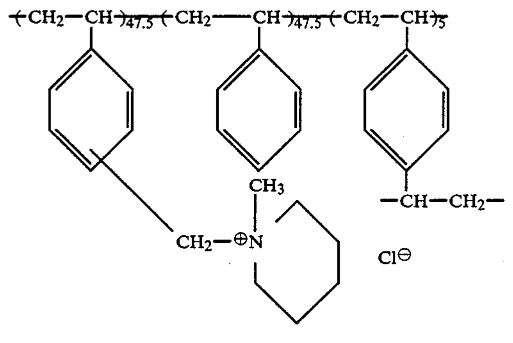

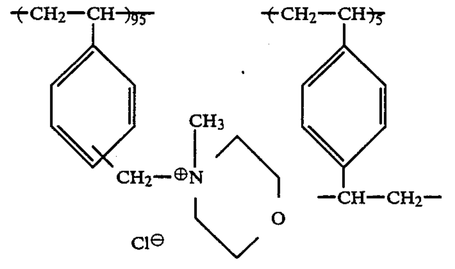

Other useful mordants include vinyl pyridine polymers and vinyl pyridinium cation polymers as disclosed in U.S. Pat. Nos. 2,548,564, 2,484,430, 3,148,161 and 3,756,814; polymeric mordants crosslinkable with gelatin or the like as disclosed in U.S. Pat. Nos. 3,625,694, 3,859,096, and 4,128,538 and British Pat. No. 1,277,453; aqueous sol type mordants are disclosed in U.S. Pat. Nos. 2,721,852, 2,798,063, and 3,958,995, Japanese Patent Application Kokai No. 54-26027, 54-115228, and 54-145529; water-insoluble mordants as disclosed in U.S. Pat. No. 3,898,088; reactive mordants as disclosed in U.S. Pat. No. 4,168,976 (Japanese Patent Application Kokai No. 54-137333); and mordants as disclosed in U.S. Pat. Nos. 3,271,147, 3,271,148, 3,488,706, 3,557,066, 3,642,482, 3,709,690, and 3,788,855 and Japanese Patent Application Kokai Nos. 50-71332, 52-155528, 53-125, and 53-1024, and 53-30328.

Also useful are the mordants described in U.S. Pat. Nos. 2,675,316 and 2,882,156.

The polymeric mordants used herein may have a molecular weight of from about 1,000 to about 1,000,000, more preferably from about 10,000 to about 200,000.

The polymeric mordant is generally used in admixture with a hydrophilic colloid. The hydrophilic colloid used herein may be of the same type as the hydrophilic colloid previously described for the back layer although the typical example is gelatin.

The mixing ratio of polymeric mordant to gelatin and the amount of polymeric mordant coated may be readily determined by those skilled in the art depending on the amount of dye to be mordanted, the type and composition of polymeric mordant, and the image forming process involved. In general, the ratio of polymeric mordant to gelatin ranges from about 20/80 to about 80/20 in weight ratio. The coating weight of polymeric mordant preferably ranges from about 0.2 to about 15 $g/m^2$, more preferably from about 0.5 to about 8 $g/m^2$.

The dye-fixing layer may be a single layer or two or more layers. An auxiliary layer may be provided above or below the dye-fixing layer. It is preferred to provide a protective layer on a dye-fixing layer containing a mordant to improve the strength of an image to mechanical operation.

A layer present in the dye-fixing element on the side of the dye-fixing layer may contain a base or base precursor as previously described. The amount of base or base precursor added preferably ranges from about 0.1 to about 10 $g/m^2$.

In one preferred embodiment, as described in EP 210,660A2 (U.S. Ser. No. 890,443 filed July 30, 1986), a photosensitive element contains a substantially water-insoluble basic metal compound while a dye-fixing element contains a complexing compound capable of water-mediated complexing reaction with the metal ion of the substantially water-insoluble basic metal compound as a base precursor.

The complexing compound, when used as a salt, tends to precipitate in the coating or film. Such precipitation can be prevented by adding polymers such as dextran and pluran as described in Japanese Patent Application No. 60-187600 and polyalkylene oxide as described in Japanese Patent Application No. 60-206092. Dextran and pluran belong to polysaccharides and are polymers of D-glucose. The dextran used herein preferably has a molecular weight of about 20,000 to about 2,000,000, more preferably from about 100,000 to about 800,000. The pluran used herein preferably has a molecular weight of about 20,000 to about 2,000,000. Also useful are derivatives of dextran and pluran which are obtained by introducing a sulfinic acid group or amino group into dextran or pluran and which are ready for reaction with a hardener.

EXAMPLES

In order that those skilled in the art may better understand how the present invention is practiced, the following examples are given by way of illustration and not by way of limitation.

EXAMPLE 1

A photographic color photosensitive material was prepared by coating a sheet of paper having polyethylene laminated on both the surfaces with a first (lowermost) layer through a seventh (uppermost) layer as reported in Table 1. A matte agent according to the present invention was added to the seventh layer as reported in Table 2. The resulting photographic color photosensitive materials are designated sample Nos. 101 through 103.

The samples were processed with the following solutions in the following conditions before they were subjected to an adhesive test.

| | |
|---|---|
| Developer | |
| Benzyl alcohol | 15 ml |
| Diethylenetriamine pentaacetate | 5 g |
| KBr | 0.4 g |
| $Na_2SO_3$ | 5 g |
| $Na_2SO_3$ | 30 g |
| Hydroxylamine sulfate | 2 g |
| 4-amino-3-methyl-N—β-(methane-sulfonamide) ethylaniline $3/2H_2SO_4.H_2O$ | 4.5 g |
| Water totaling to | 1000 ml |
| | pH 10.1 |
| Blix solution | |
| Ammonium thiosulfate (70 wt %) | 150 ml |
| $Na_2SO_3$ | 5 g |
| Na[Fe(EDTA)] | 40 g |
| EDTA | 4 g |
| Water totaling to | 1000 ml |
| | pH 6.8 |

Processing steps

| Step | Temperature | Time, |
|---|---|---|
| Developer | 33° C. | 3 min. 30 sec. |
| Blix solution | 33° C. | 1 min. 30 sec. |
| Washing | 28–35° C. | 3 min. |

TABLE 1

Support
double-side polyethylene laminated paper support
First layer: Blue-sensitive layer
Silver chlorobromide emulsion (Cl 20 mol %, coating weight 400 mg/$m^2$ of Ag)
Gelatin (coating weight 700 mg/$m^2$)
Yellow coupler*6 (coating weight 500 mg/$m^2$)
Coupler solvent*7 (coating weight 400 mg/$m^2$)
Second layer: intermediate layer
Gelatin (coating weight 1000 mg/$m^2$)
Third layer: Green-sensitive layer
Silver chlorobromide emulsion (Cl 30 mol %, coating weight 500 mg/$m^2$ of Ag)
Gelatin (coating weight 700 mg/$m^2$)
Magenta coupler*4 (coating weight 400 mg/$m^2$)
Coupler solvent*5 (coating weight 400 mg/$m^2$)
Fourth layer: Intermediate layer
Gelatin (coating weight 800 mg/$m^2$)
UV absorber*3 (coating weight 1600 mg/$m^2$)
UV absorber solvent*2 (coating weight 300 mg/$m^2$)
Fifth layer: Red-sensitive layer
Silver chlorobromide emulsion (Cl 50 mol %, coating weight 300 mg/$m^2$)
Gelatin (coating weight 500 mg/$m^2$)
Cyan coupler*1 (coating weight 400 mg/$m^2$)

TABLE 1-continued

Coupler solvent*2 (coating weight 300 mg/$m^2$)
Sixth layer: Intermediate layer
Gelatin (coating weight 800 mg/$m^2$)
UV absorber*3 (coating weight 1600 mg/$m^2$)
UV absorber solvent*2 (coating weight 300 mg/$m^2$)
Seventh layer: Protective layer
Gelatin (coating weight 1600 mg/$m^2$)

*1 Cyan coupler: 2-[α-(2,4-tert.-pentylphenoxy)-butanamido]-4,6-dichloro-5-methylphenol
*2 Solvent: dibutyl phthalate
*3 UV absorber: 2-(2-hydroxy-3-sec.-butyl-5-tert.-butyl-phenyl)benzotriazole
*4 Magenta coupler: 1-(2,4,6-trichlorophenyl)-3-(2-chloro-5-tetradecanamido)anilino-5-pyrazolone
*5 Solvent: tricresyl phosphate
*6 Yellow coupler: α-pyvaloyl-α-(2,4-dioxo-5,5'-dimethyl-oxazolidin-3-yl)-2-chloro-5-[α-(2,4-di-tert.-pentylphenoxy)butanamido]acetanilide
*7 Solvent: dioctyl butyl phosphate

Adhesive test

Each of the processed samples was dried and cut into pieces of 4 cm by 8 cm. A pair of pieces from the same sample were regulated for humidity by maintaining at 35° C. and 90% RH for 24 hours. The pieces were mated such that their protective layers faced each other and allowed to stand under a load of 500 grams at 35° C. and 90% RH for 24 hours. With the load relieved, two pieces were peeled away at the interface between their protective layers. The surface area of bonded portions which were perceivable by a change of gloss was determined and calculated in percent based on the overall surface area. Anti-adherence was evaluated according to the following criterion.

Rating A: The bonded area is 0–40%.

Rating B: The bonded area is 41–80%.

Rating C: The bonded area is at least 81%, or peeling caused part of the emulsion layer or support to be removed away because of a strong bond.

The results are shown in Table 2.

TABLE 2

| | Matte agent | | | |
|---|---|---|---|---|
| Sample | Type | Average particle size | Coating weight | Anti-adherence |
| 101* | — | — | — | C |
| 102 | Epostar ® | 3 μm | 0.02 g/$m^2$ | B |
| 103 | Epostar ® | 6 μm | 0.02 g/$m^2$ | A |

*control
Note: Epostar is a trademark of matte agent manufactured by Nihon Catalyst Chemical Industry K.K.

As evident from Table 2, the samples containing the matte agent according to the present invention show improved anti-adherence.

EXAMPLE 2

A primed polyethylene terephthalate film support of 180 μm thick was coated on one surface with a silver halide emulsion layer of the following composition and then with a protective layer of the following composition. The support was further coated on the other surface with a back layer of 4 g/$m^2$ of gelatin and a protective layer therefor. Drying resulted in black-and-white silver halide photosensitive materials which are designated sample Nos. 201 through 203.

Emulsion layer

Thickness: about 5 μm

Composition: A gelatin emulsion of silver iodobromide containing 1.5 mol % of silver iodide (silver halide grains having an average grain size of 1.3 μm) was ripened by adding 0.6 mg of chloroauric acid and 3.4 mg of sodium thiosulfate per mol of silver halide and heating at 60° C. for 50 minutes. To the resulting emulsion, 4-hydroxy-6-methyl-1,3,3a,7-tetrazaindene was added as a stabilizer.

Protective layer

| | |
|---|---|
| Thickness: about 1 μm | |
| Composition and coating weight: | |
| Gelatin | 1.0 $g/m^2$ |
| $C_{12}H_{25}—O—(CH_2CH_2O)_{10}—H$ | 60 $mg/m^2$ |
| Sodium 2,6-dichloro-6-hydroxy-1,3,5-triazine | 10 $mg/m^2$ |

Back protective layer

The back protective layer had the same composition as the protective layer for the emulsion layer except that a matte agent was further added as reported in Table 3. Sample Nos. 201 through 203 were prepared.

Adhesive test

Each sample was cut into pieces of 4 cm by 4 cm. A pair of pieces from the same sample were regulated for humidity by maintaining at 35° C. and 75% RH for 24 hours. The pieces were mated such that the back layer of one piece faced the protective layer of the other piece and allowed to stand under a load of 1 kg at 35° C. and 75% RH for 18 hours. With the load relieved, two pieces were peeled away at the interface between the back and protective layers. The surface area of bonded portions was determined and calculated in percent based on the overall surface area. It should be noted that bonded portions of the protective layer were perceivable as portions colored with the dye transferred from the back layer. Anti-adherence was evaluated according to the following criterion.

Rating A:
The bonded area is 0–25%.
Rating B:
The bonded area is 26–50%.
Rating C:
The bonded area is 51–75%.
Rating D:
The bonded area is at least 76%, or the pieces could not be peeled away because of a strong bond.

TABLE 3

| Sample | Type | Matte agent Average particle size | Coating weight | Anti-adherence |
|---|---|---|---|---|
| 201 | — | — | — | D |
| 202 | Epostar ® | 3 μm | 0.04 $g/m^2$ | B |
| 203 | Epostar ® | 6 μm | 0.04 $g/m^2$ | A |

Note: Epostar is a tradmark of matte agent manufactured by Nihon Catalyst Chemical Industry K.K.

As evident from Table 3, sample Nos. 202 and 203 containing the matte agent according to the present invention show improved anti-adherence.

EXAMPLE 3

Preparation of Silver Halide Emulsions

A silver halide emulsion used in a first layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mol of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol %).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide, another aqueous solution of 0.59 mol of silver nitrate in 600 ml of water, and a solution of 160 mg of a dye having formula (I) defined below in 400 ml of methanol were concurrently added to the gelatin solution at an equal flow rate over a period of 40 minutes. In this way, there was prepared a monodispersed emulsion of dye-adsorbed cubic silver chlorobromide grains having an average grain size of 0.35 μm (bromine 80 mol %).

Dye (I)

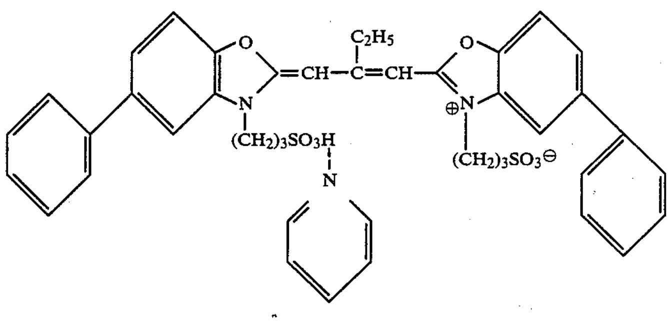

After water rinsing and desalting, 5 mg of sodium thiosulfate and 20 mg of 4-hydroxy-6-methyl-1,3,3*a*,7-tetraazaindene were added to effect chemical sensitization at 60° C. There was obtained an emulsion in a yield of 600 grams.

A silver halide emulsion used ina fifth layer was prepared as follows.

An aqueous gelatin solution was prepared by dissolving 20 grams of gelatin and ammonia in 1000 ml of water and kept at a temperature of 50° C. An aqueous solution of potassium iodide and potassium bromide in 1000 ml of water and another aqueous solution of 1 mol of silver nitrate in 1000 ml of water were concurrently added to the thoroughly agitated gelatin solution while maintaining the pAg constant. In this way, there was prepared a monodispersed octahedral silver iodobromide emulsion having an average grain size of 0.5 μm (iodide 5 mol %).

After rinsing with water and desalting, 5 mg of chloroauric acid tetrahydrate and 2 mg of sodium thiosulfate were added to effect gold and sulfur sensitization at 60° C. There was obtained an emulsion in a yield of 1000 grams.

Preparation of Organic Silver Salts

Organic silver salt (1)

A silver benzotriazole emulsion was prepared by dissolving 28 grams of gelatin and 13.2 grams of benzotriazole in 300 ml of water. The solution was agitated at 40° C. To the solution was added 17 grams of silver nitrate in 100 ml water over a period of 2 minutes. The resulting silver benzotriazole emulsion was adjusted to such pH that an excess salt precipitated, and the excess salt was removed. The emulsion was then adjusted to pH 6.30, obtaining a silver benzotriazole emulsion in a yield of 400 grams.

Organic silver salt (2)

A dispersion of organic silver salt (2) was prepared by dissolving 20 grams of gelatin and 5.9 grams of 4-acetylaminophenyl propiolic acid in 1000 ml of an aqueous solution of 0.1% sodium hydroxide and 200 ml of ethanol. The solution was agitated at 40° C. To the solution was added 4.5 grams of silver nitrate in 200 ml of water over a period of 5 minutes. The dispersion was adjusted to such pH that an excess salt was precipitated, and the excess salt was removed. The dispersion was adjusted to pH 6.3, obtaining an organic silver salt (2) dispersion in a yield of 300 grams.

Next, a dispersion of a dye-providing substance in gelatin was prepared as follows.

Preparation of Gelatin Dispersion of Dye-Providing Substance

Five (5) grams of yellow dye-providing substance (A) having the formula shown below was dissolved together with 0.2 grams of auxiliary developing agent (D), 0.2 grams of antifoggant (E), 0.5 grams of succinic acid-2-ethylhexyl ester sodium sulfonate surface-active agent, and 2.5 grams of triisononyl phosphate in 15 ml of ethyl acetate by heating at about 60° C., obtaining a homogeneous solution. The solution was mixed with 40 grams of a 10 wt % lime-treated gelatin solution by agitation, and the mixture was dispersed with a homogenizer for 10 minutes at 10,000 rpm. This dispersion is called yellow dye-providing substance dispersion.

Magenta and cyan dye-providing substance dispersions were prepared by the same procedure as above except that magenta and cyan dye-providing substances (B) and (C) were used as the dye-providing substance.

Dye-providing substance (A)

(A)

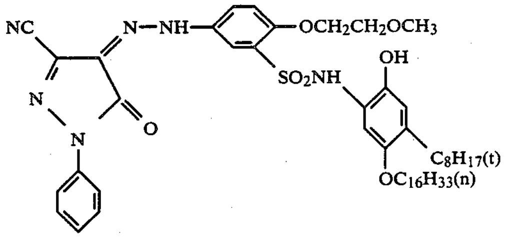

Dye-providing substance (B)

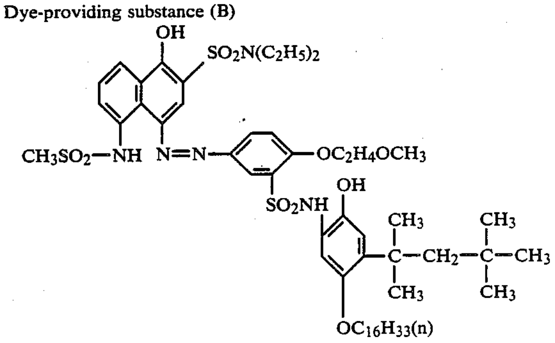

Dye-providing substance (C)

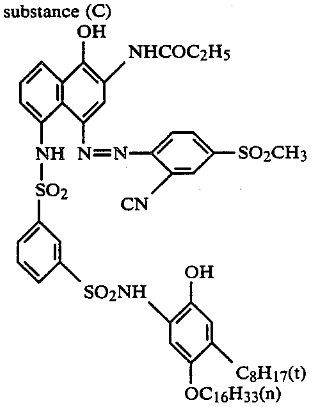

Auxiliary developing agent (D)

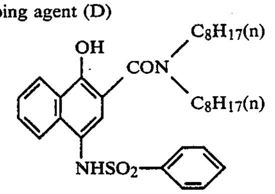

Antifoggant (E)

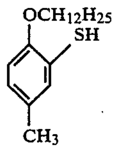

Using these preparations, there was prepared a color photosensitive material of multi-layer structure as shown in Table 4.

TABLE 4

| FORMULATION |
| --- |
| Seventh layer |
| gelatin (coating weight 300 mg/m$^2$) |
| silica*5 (coating weight 100 mg/m$^2$) |

TABLE 4-continued

| FORMULATION |
| --- |
| zinc hydroxide*7 (coating weight 300 mg/m$^2$) |
| Sixth layer |
| gelatin (coating weight 500 mg/m$^2$) |
| hardener*6 (coating weight 100 mg/m$^2$) |
| Fifth layer: Blue-sensitive emulsion layer |
| silver chlorobromide emulsion (bromide 80 mol %, coating weight 300 mg/m$^2$ of Ag) |
| dimethylsulfamide (coating weight 180 mg/m$^2$) |
| organic silver salt (2) (coating weight 100 mg/m$^2$) |
| yellow dye-providing substance (A) (coating weight 400 mg/m$^2$) |
| gelatin (coating weight 1000 mg/m$^2$) |
| auxiliary developing agent (D) (coating weight 16 mg/m$^2$) |
| high-boiling solvent*4 (coating weight 200 mg/m$^2$) |
| surface-active agent*2 (coating weight 100 mg/m$^2$) |
| antifoggant (E) (coating weight 16 mg/m$^2$) |
| Fourth layer: Intermediate layer |
| gelatin (coating weight 1000 mg/m$^2$) |
| zinc hydroxide*7 (coating weight 300 mg/m$^2$) |
| Third layer: Green-sensitive emulsion layer |
| silver chlorobromide emulsion (bromide 80 mol %, coating weight 300 mg/m$^2$ of Ag) |
| dimethylsulfamide (coating weight 180 mg/m$^2$) |
| organic silver salt (2) (coating weight 100 mg/m$^2$) |
| magenta dye-providing substance (B) (coating weight 400 mg/m$^2$) |
| gelatin (coating weight 1000 mg/m$^2$) |
| auxiliary developing agent (D) (coating weight 16 mg/m$^2$) |
| high-boiling solvent*4 (coating weight 200 mg/m$^2$) |
| surface-active agent*2 (coating weight 100 mg/m$^2$) |
| antifoggant (E) (coating weight 16 mg/m$^2$) |
| Second layer: Intermediate layer |
| gelatin (coating weight 800 mg/m$^2$) |
| zinc hydroxide*7 (coating weight 300 mg/m$^2$) |
| First layer: Red-sensitive emulsion layer |
| silver chlorobromide emulsion (bromine 80 mol %, coating weight 300 mg/m$^2$ of Ag) |
| dimethysulfamide (coating weight 180 mg/m$^2$) |
| sensitizing dye*3 (coating weight 8 × 10$^{-7}$ mol/m$^2$) |
| organic silver salt (1) (coating weight 100 mg/m$^2$) |
| cyan dye-providing substance (C) (coating weight 300 mg/m$^2$) |
| gelatin (coating weight 1000 mg/m$^2$) |
| auxiliary developing agent (D) (coating weight 12 mg/m$^2$) |
| high-boiling solvent*4 (coating weight 150 mg/m$^2$) |
| surface-active agent*2 (coating weight 100 mg/m$^2$) |
| antifoggant (E) (coating weight 12 mg/m$^2$) |
| Support*1 |

*1polyethylene terephthalate film of 100 μm thick

*2

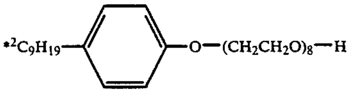

*3

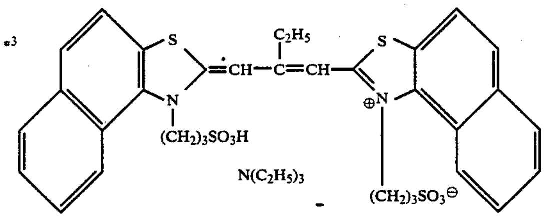

*4(iso-$C_9H_{19}O)_3P$=O

*5size 4 μm

*61,2-bis(vinylsulfonylacetamide)ethane

*7size 0.2 μm

A series of dye-fixing materials of the structure shown in Table 5 were prepared using polyethylene terephthalate and paper supports. They are designated sample Nos. 301 through 311.

The dispersions of fine particulate matte agent added to the back layer were dispersions A through F shown in Table 6.

TABLE 5

Composition of layers

| Ingredient | Amount (g/m$^2$) |
| --- | --- |
| Third layer: protective layer | |
| Vinyl alcohol-acrylic acid (75/25 molar ratio) copolymer | 0.25 |
| Surface-active agent A*1 | 0.02 |
| Surface-active agent B*2 | 0.1 |
| Second layer: dye-fixing layer | |
| Gelatin | 1.4 |
| Dextran (MW 70,000) | 1.4 |
| Mordant*3 | 2.8 |
| Oil droplet*4 | 1.8 |
| Guanidium picolinate | 2.4 |
| First layer | |
| Gelatin | 0.4 |
| Hardener A*5 | 0.3 |
| Support | |
| Polyethylene terephthalate or paper haveing polyethylene laminated on both surfaces (thickness 100 μm) | |
| First layer: back layer | |
| Gelatin | 6.4 or 3.3 |
| Hardener A*5 | 0.3 |
| Second layer: back layer | |
| Gelatin | 0.4 |
| Fine particulate dispersion (Table 6) | Table 7 |
| Surface-active agent C*6 | 0.05 |
| Silicone oil droplet*7 | 0.05 |

*1Surface-active agent A

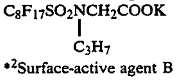

*2Surface-active agent B

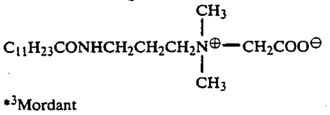

*3Mordant

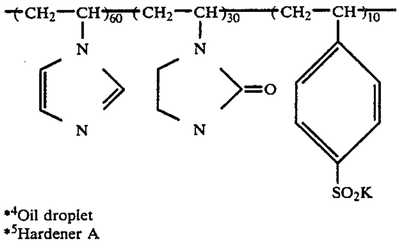

*4Oil droplet

*5Hardener A

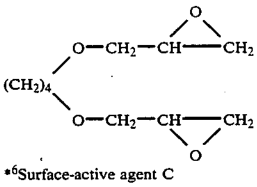

*6Surface-active agent C

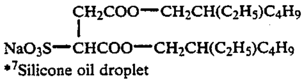

*7Silicone oil droplet

Preparation and addition of oil droplets

To 100 grams of an aqueous solution of 10% gelatin were added 5 ml of an aqueous solution of 5% sodium dodecylbenzene sulfonate and then 20 grams of Rheophos 95 (manufactured by Ajinomoto K.K.). The mixture was dispersed and emulsified by a homoblender at 10,000 rpm for 6 minutes, obtaining a dispersion of oil droplets.

This dispersion was added to a coating composition for a dye-fixing layer (first layer).

A dispersion of silicone oil droplets was prepared by the same procedure as described in *4 except that Rheophos 95 was replaced by silicone oil (dimethyl polysiloxane).

The dispersions used in the back layers are shown in Table 6. The type, hardness, and average particle size of fine particulate compound are reported as well as the proportion in vol % of those particles having a particle size of more than 10 μm based on the total volume of the particles.

TABLE 6

| Dispersion | Particulate compound*1 | Hardness*2 | Average particle size (μm) | Vol % of more than 10 μm particles |
|---|---|---|---|---|
| A | BG | >90 | 5.6 | 2 |
| B | BG | >90 | 6.5 | 9 |
| C | BG | >90 | 6.9 | 18 |
| D | PE | 48 | 5.2 | 1.5 |
| E | PE | 48 | 6.9 | 12 |
| F | PE | 48 | 8.8 | 50 |

*1BG: benzoguanamine resin
PE: polyethylene
*2JIS K7215 Durometer D test

The multi-layered color photosensitive material was uniformly exposed for one second to a tugsten lamp through a green filter at 200 lux.

Two sheets of the dye-fixing material were placed one on top of the other such that the front surface of one sheet was in contact with the back surface of the other sheet. The sheets were maintained for 2 days under a pressure of 8 kg per A4 size at 25° C. and 70% RH before they were separated from each other. The one sheet thus separated was used as the dye-fixing material.

Water was applied to the emulsion surface of the exposed photosensitive material in an amount of 15 $ml/m^2$ by means of a wire bar. The wet photosensitive material was placed on the dye-fixing material such that their effective surfaces mated with each other.

The assembly was heated for 25 seconds by a heat roller which was temperature controlled such that the wet film reached a temperature of 90° C. The photosensitive material was peeled away from the dye-fixing material which bore a transferred magenta color image throughout the surface.

The density of each color was measured to examine a density variation. The density was measured by means of a scanning auto-recording densitometer. The density variation was evaluated as follows.

P: Variations with ΔD of at least 0.5 were found over the entire surface.

F: Variations with ΔD of 0.2 to 0.3 were found over 5 to 10% of the entire surface.

G: Variations with ΔD of 0.2 to 0.3 were found over 2 to 3% of the entire surface.

E: No density variation.

The results are shown in Table 7, which also reports the haze in % of the image. The haze was measured by a haze meter Model 1001DP manufactured by Nihon Denshoku Kogyo-K.K.

TABLE 7

| Dye-fixing material | Support | Coating weight of gelatin in first back layer ($g/m^2$) | Particulate Dispersion Type | Particulate Dispersion Coating weight ($g/m^2$) | Amount of more than 10 μm particles (cm3/m2) | Haze (%) | Density variation |
|---|---|---|---|---|---|---|---|
| 301 | PE | 6.4 | A | 0.1 | 0.0015 | 10.5 | P |
| 302 | PE | 6.4 | B | 0.1 | 0.0068 | 7.3 | G |
| 303 | PE | 6.4 | C | 0.1 | 0.0136 | 6.5 | E |
| 304 | PE | 6.4 | D | 0.1 | 0.0015 | 10.2 | P |
| 305 | PE | 6.4 | E | 0.1 | 0.0122 | 6.8 | G or F |
| 306 | PE | 6.4 | F | 0.1 | 0.0510 | 4.8 | G or E |
| 307 | PE | 6.4 | A | 0.3 | 0.0045 | 40.8 | F |
| 308 | PE | 6.4 | C | 0.05 | 0.0068 | 3.5 | G or E |
| 309 | Paper | 3.3 | A | 0.1 | 0.0015 | — | P |
| 310 | Paper | 3.3 | B | 0.1 | 0.0068 | — | G |
| 311 | Paper | 3.3 | C | 0.1 | 0.0136 | — | E |

Dye-fixing materials based on a transparent support, that is, a polyethylene terephthalate support are generally used for OHP, in which application a haze of lower than about 10% is desirable. It is evident from Table 7 that the dye-fixing materials having formed thereon a back layer containing a certain amount of particles having a particle size in excess of 10 μm show a haze of lower than 10% and a markedly reduced density variation.

Also with a paper support, a dye-fixing material having formed thereon a similar back layer shows a less density variation. Better results are obtained particularly when particles of benzoguanamine resin are used.

Two mated sheets of dye-fixing material could be readily separated from each other after storage under pressure when the dye-fixing material was in accord with the present invention. In the case of dye-fixing material sample Nos. 301, 304 and 309, two sheets should be carefully separated because the coating of one sheet was otherwise left bonded to the other sheet.

We claim:

1. A photographic element comprising particles of a benzoguanamine-formaldehyde condensation polymer having the formula:

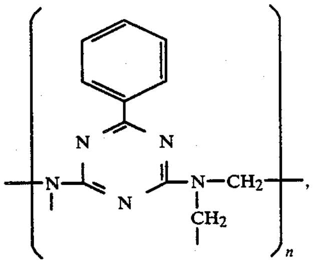

wherein n is a positive integer.

2. The photographic element of claim 1, wherein n is at least 10.

3. The photographic element of claim 1, wherein n is at least 50.

4. The photographic element of claim 1, wherein the polymer has an average particle size ranging from about 0.1 to about 70 μm.

5. The photographic element of claim 1, wherein the polymer has a hardness of at least 40 in durometer D scale.

* * * * *